United States Patent
Sugawara et al.

(10) Patent No.: US 10,216,071 B2
(45) Date of Patent: Feb. 26, 2019

(54) OPTICAL SYSTEM AND OPTICAL APPARATUS INCLUDING THE SAME

(71) Applicant: CANON KABUSHIKI KAISHA, Tokyo (JP)

(72) Inventors: Saburo Sugawara, Yachiyo (JP); Makoto Takahashi, Utsunomiya (JP); Junya Ichimura, Utsunomiya (JP)

(73) Assignee: Canon Kabushiki Kaisha, Tokyo (JP)

(*) Notice: Subject to any disclaimer, the term of this patent is extended or adjusted under 35 U.S.C. 154(b) by 110 days.

(21) Appl. No.: 15/135,397

(22) Filed: Apr. 21, 2016

(65) Prior Publication Data

US 2016/0313631 A1 Oct. 27, 2016

(30) Foreign Application Priority Data

Apr. 27, 2015 (JP) ................. 2015-090255

(51) Int. Cl.
 *G03B 21/14* (2006.01)
 *G03B 21/28* (2006.01)
 *G03B 21/00* (2006.01)

(52) U.S. Cl.
 CPC ........... *G03B 21/142* (2013.01); *G03B 21/28* (2013.01); *G03B 21/006* (2013.01)

(58) Field of Classification Search
 CPC ..... G03B 21/142; G03B 21/006; G03B 21/28
 USPC .......................................................... 353/31
 See application file for complete search history.

(56) References Cited

U.S. PATENT DOCUMENTS

| | | | |
|---|---|---|---|
| 5,130,855 A * | 7/1992 | Mukai | G03B 13/08 359/403 |
| 5,414,239 A | 5/1995 | Terabayashi | |
| 6,226,122 B1 | 5/2001 | Sugawara | |
| 6,304,395 B1 * | 10/2001 | Ito | G02B 5/04 359/584 |
| 6,549,337 B2 | 4/2003 | Iizuka | |
| 6,563,642 B2 | 5/2003 | Sugawara | |
| 6,717,752 B2 | 4/2004 | Kanai | |
| 6,765,544 B1 * | 7/2004 | Wynne Willson | H04N 9/3141 345/6 |

(Continued)

FOREIGN PATENT DOCUMENTS

| | | |
|---|---|---|
| JP | 58-068712 A | 4/1983 |
| JP | 7-168098 A | 7/1995 |
| JP | 7-230042 A | 8/1995 |

(Continued)

OTHER PUBLICATIONS

Machine Translation of JP 201012248 A.*

*Primary Examiner* — Steven H Whitesell Gordon
*Assistant Examiner* — Jerry Brooks
(74) *Attorney, Agent, or Firm* — Canon U.S.A., Inc. I.P. Division

(57) ABSTRACT

An optical system has a first optical axis on an incident side and a second optical axis on an exit side, and the first optical axis and the second optical axis are located at different positions. The optical system includes a reflection unit including a roof surface having a first reflection surface and a second reflection surface, and a third reflection surface parallel or orthogonal to a ridge line of the roof surface. The third reflection surface is different from the first reflection surface and the second reflection surface. The reflection unit is rotatable about the first optical axis.

17 Claims, 15 Drawing Sheets

(56) References Cited

U.S. PATENT DOCUMENTS

2011/0109971 A1* 5/2011 Beach ............... G02B 13/0055
359/618

FOREIGN PATENT DOCUMENTS

| JP | 8-190076 A | 7/1996 | | |
|----|----|----|----|----|
| JP | 2000-78616 A | 3/2000 | | |
| JP | 2002-090879 A | 3/2002 | | |
| JP | 2005-24573 A | 1/2005 | | |
| JP | 2006-145647 A | 6/2006 | | |
| JP | 2010-122485 A | 6/2010 | | |
| JP | 201012248 A | * 6/2010 | ............ | G02B 27/18 |

* cited by examiner

OPTICAL SYSTEM AND OPTICAL APPARATUS INCLUDING THE SAME

BACKGROUND OF THE INVENTION

Field of the Invention

The present invention is suitable for a projector that projects an image in a personal computer or the like onto a screen in an enlarged manner, and in particular relates to an optical system that can rotate an image projected on a screen and to an optical apparatus including such an optical system.

Description of the Related Art

To date, a projection optical system for rotating an image on a screen of a projector has been proposed. Japanese Patent Laid-Open No. 2000-78616 discloses a projection-type display apparatus. In the projection-type display apparatus, an image rotating prism constituted by a Dove prism for reflecting light once that is rotatable about an optical axis is disposed between a projection lens and a display element, and thus an image projected on a screen can be rotated.

According to Japanese Patent Laid-Open No. 2010-122485, a Pechan prism for reflecting light five times is disposed between a projection lens and a relay lens unit, and thus an image on a screen can be rotated. In addition, according to Japanese Patent Laid-Open No. 2005-24573, one of two reflection mirrors disposed outside a projector is rotated about an optical axis of a projection lens, and thus an image on a screen is rotated.

As in the existing techniques described above, projection optical systems for rotating an image on a screen have been proposed. However, when an image rotating prism for rotating a projected image about an optical axis is embedded inside a projection optical system, an optical path for disposing the image rotating prism becomes excessively long.

Specifically, according to Japanese Patent Laid-Open No. 2000-78616, the optical path length necessary for disposing the Dove prism is approximately 4.4 times the effective diameter of the one of an incident surface of the prism and an exit surface thereof that has a greater effective diameter. In addition, according to Japanese Patent Laid-Open No. 2010-122485, the optical path length necessary for the Pechan prism is 4.6 times the effective diameter of the one of an incident surface of the Pechan prism and an exit surface thereof that has a greater effective diameter.

When an optical path necessary for disposing an image rotating prism is long, the total length of the projection optical system increases. Furthermore, when an optical path within a prism is long, this leads to a problem in that the diameter of the front lens in the projection optical system needs to be increased. In addition, due to the design of a projection optical system, a space that is free of any lens needs to be secured within the optical system, and this may impose considerable constraint on the design, leading to a problem in that good optical performance cannot be achieved.

Furthermore, according to Japanese Patent Laid-Open No. 2005-24573, when the projection optical system has a wide angle, this leads to a problem in that the size of a reflection mirror is increased excessively. In a case of the front projection in which the projector and a viewer viewing an image projected on a screen are located on the same side relative to the screen, when the size of the reflection mirror is excessively large, this leads to a problem in that the reflection mirror may cover the screen and hinder the viewing.

As described above, when the optical systems that have been proposed to date are to be applied in specific cases, the optical systems require a long optical path and are thus unable to be put into practical use.

SUMMARY OF THE INVENTION

The present invention provides an optical system that includes a rotatable reflection unit that requires a short optical path inside the optical system, and an optical apparatus that includes such an optical system.

According to an aspect of the present invention, an optical system has a first optical axis on an incident side and a second optical axis on an exit side, and the first optical axis and the second optical axis are located at different positions. The optical system includes a reflection unit that includes a roof surface having a first reflection surface and a second reflection surface, and a third reflection surface that is parallel or orthogonal to a ridge line of the roof surface and that is different from the first reflection surface and the second reflection surface. The reflection unit is rotatable about the first optical axis.

In addition, according to another aspect of the present invention, an optical system includes a reflection unit rotatable about the first optical axis and a lens system, and has a positive refractive power as a whole.

Further features of the present invention will become apparent from the following description of exemplary embodiments with reference to the attached drawings.

DESCRIPTION OF THE EMBODIMENTS

Hereinafter, exemplary embodiments of the present invention will be described with reference to the drawings.

First Exemplary Embodiment

Optical Apparatus

Figure 1:
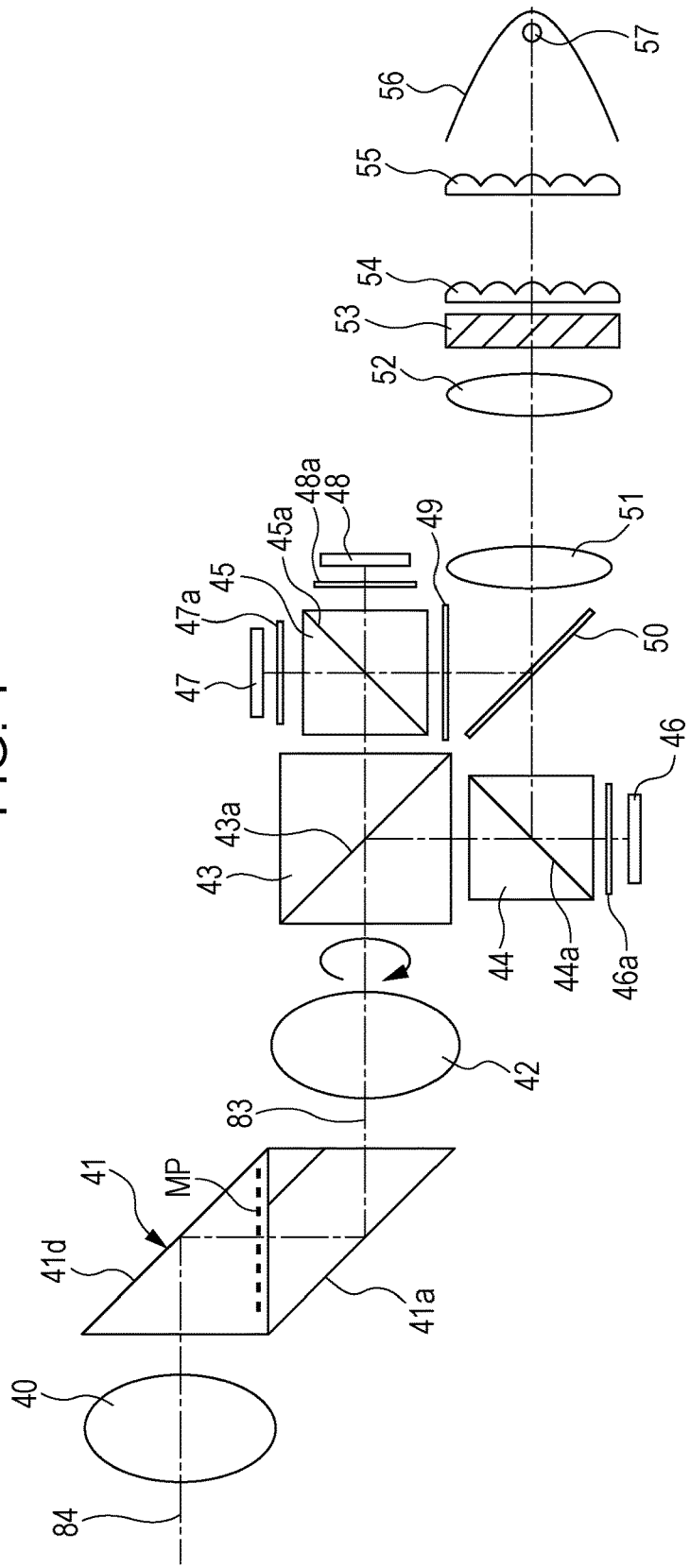
FIG. 1 illustrates a configuration (sectional view) of an image projection apparatus that includes an optical system according to a first exemplary embodiment of the present invention.

FIG. 1 illustrates a configuration (sectional view) of an image projection apparatus serving as an optical apparatus that includes an optical system, which will be described later, according to a first exemplary embodiment of the present invention. In an illumination optical system, illumination light emitted by a light source 57 is collimated by a paraboloidal mirror 56 and is incident, as parallel light, on a first lens array 55. The illumination light is condensed on lens cells in a second lens array 54, and the condensed light rays are polarized in the same direction by a polarization conversion element 53. The illumination optical system as referred to herein includes the first lens array 55, the second lens array 54, the polarization conversion element 53, and positive lenses 51 and 52.

The illumination light emitted from the polarization conversion element 53 is incident on a dichroic mirror 50 via the positive lenses 52 and 51. The illumination light undergoes color separation by the dichroic mirror 50. Specifically, green light is transmitted through the dichroic mirror 50, and magenta light in which blue light and red light are combined is reflected by the dichroic mirror 50. The green illumination light transmitted through the dichroic mirror 50 is incident on a polarization beam splitter 44 and is reflected by a polarization beam splitting surface 44a. The reflected illumination light is then incident on a quarter-wave plate 46a and is modulated and reflected by a reflective liquid crystal panel 46 serving as an image display element capable of modulation.

The light that has been modulated and reflected by the reflective liquid crystal panel 46 is again incident on the quarter-wave plate 46a, is transmitted through the polarization beam splitting surface 44a, and is incident on a polarization beam splitter 43. The green light incident on the polarization beam splitter 43 is then reflected by a polarization beam splitting film 43a and is incident on a second lens unit 42.

In the meantime, the magenta light that has been reflected by the dichroic mirror 50 is incident on a wavelength-selective phase plate 49, which changes the phase of only the light in a specific wavelength band, and is then incident on a polarization beam splitter 45. Of the magenta light incident on the polarization beam splitter 45, the blue light is transmitted through a polarization beam splitting surface 45a, and the red light is reflected by the polarization beam splitting surface 45a.

The blue light that has been transmitted through the polarization beam splitting surface 45a of the polarization beam splitter 45 is incident on a quarter-wave plate 47a and is modulated and reflected by a reflective liquid crystal panel 47. The light that has been modulated and reflected by the reflective liquid crystal panel 47 is again incident on the quarter-wave plate 47a, is reflected by the polarization beam splitting surface 45a, and is incident on the polarization beam splitter 43. The blue light that has been reflected by the polarization beam splitting surface 45a and been incident on the polarization beam splitter 43 is then transmitted through the polarization beam splitting surface 43a and is incident on the second lens unit 42.

Meanwhile, the red light that has been reflected by the polarization beam splitting surface 45a of the polarization beam splitter 45 is incident on a quarter-wave plate 48a and is modulated and reflected by a reflective liquid crystal panel 48. The light that has been modulated and reflected by the reflective liquid crystal panel 48 is again incident on the quarter-wave plate 48a, is transmitted through the polarization beam splitting surface 45a, and is incident on the polarization beam splitter 43. The red light that has been transmitted through the polarization beam splitting surface 45a and been incident on the polarization beam splitter 43 is then transmitted through the polarization beam splitting surface 43a and is incident on the second lens unit 42. A color separating and combining system according to the present exemplary embodiment includes the dichroic mirror 50, the polarization beam splitters 43, 44, and 45, the wavelength-selective phase plate 49, and the quarter-wave plates 46a, 47a, and 48a.

The green light, the blue light, and the red light that have been incident on the second lens unit 42 are incident on a prism 41 configured to reflect light three times therewithin and are projected onto a screen (not illustrated) via a first lens unit 40.

Figure 2:
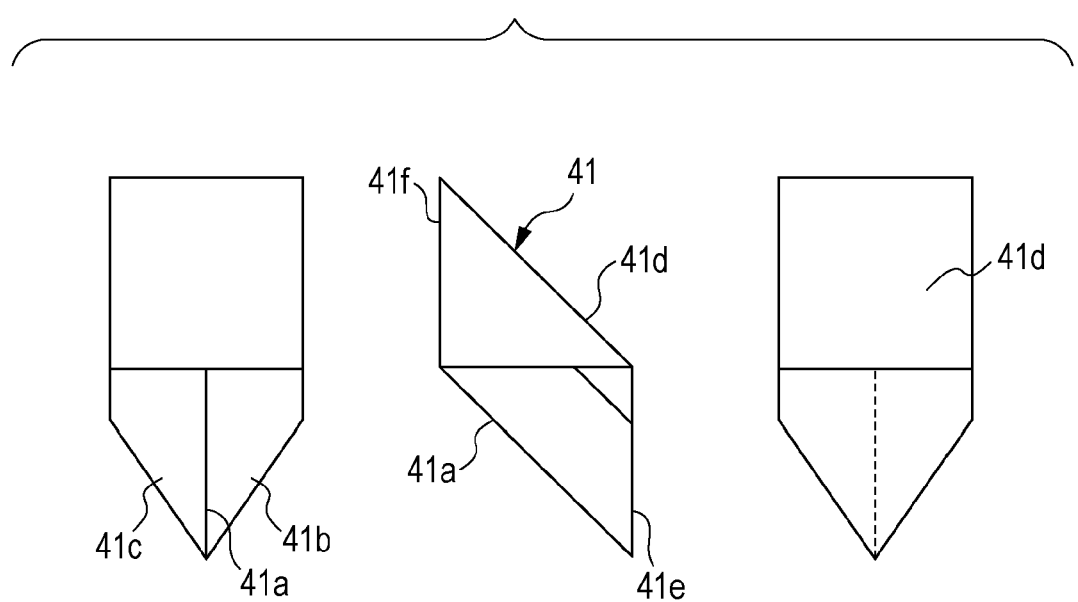
FIG. 2 illustrates a front view, a side view, and a rear view of a prism used in the first exemplary embodiment.

Optical System in which Rotatable Reflection Unit that Requires Short Optical Path is Disposed Therein A projection optical system constituted by the first lens unit 40, the prism 41 serving as a reflection unit, and the second lens unit 42 is configured to be rotatable about a first optical axis 83, or the optical axis on a reduction conjugate side (incident side, liquid crystal panel side). Thus, a projected image can be rotated on a screen about a second optical axis 84, or the optical axis on an exit side (enlargement conjugate side) translated from the first optical axis 83. FIG. 2 illustrates, from the left side of the paper plane, a front view, a side view, and a rear view of the prism 41 according to the present exemplary embodiment.

In the prism 41 according to the present exemplary embodiment, the upper portion is constituted by a triangular prism that has a triangular sectional shape along a plane containing the first optical axis 83 and the second optical axis 84 and that is rectangular as viewed from directly above. In addition, the lower portion of the prism 41 is constituted by a roof prism (Dach prism, Amici prism) that has a roof surface having a vertical angle of 90° (the angle formed by a first reflection surface 41b and a second reflection surface 41c across a ridge line 41a is 90°) and that is triangular as viewed from directly above. The upper portion and the lower portion are bonded and integrated.

Light incoming from the second lens unit 42 is incident on an incident surface 41e of the prism 41, is reflected twice, that is, once by each of the first reflection surface 41b and the second reflection surface 41c of the roof surface, and is reflected once by a third reflection surface 41d. Thus, the light is reflected three time in total and is then emitted from an exit surface 41f of the prism 41. Here, the first optical axis and the second optical axis are parallel, and when a plane including the first optical axis and the second optical axis serves as a vertical section, the third reflection surface 41d is parallel to the ridge line 41a of the roof surface (the first reflection surface and the second reflection surface) along the vertical section.

The resolving power may decrease in the first reflection surface 41b and the second reflection surface 41c of the roof surface of the prism 41 due to an influence of a phase jump caused by total reflection. Therefore, it is desirable that the roof surface be coated with a phase coat or a metal reflective film (high-reflection aluminum coat) for suppressing a phase jump.

Figure 3:
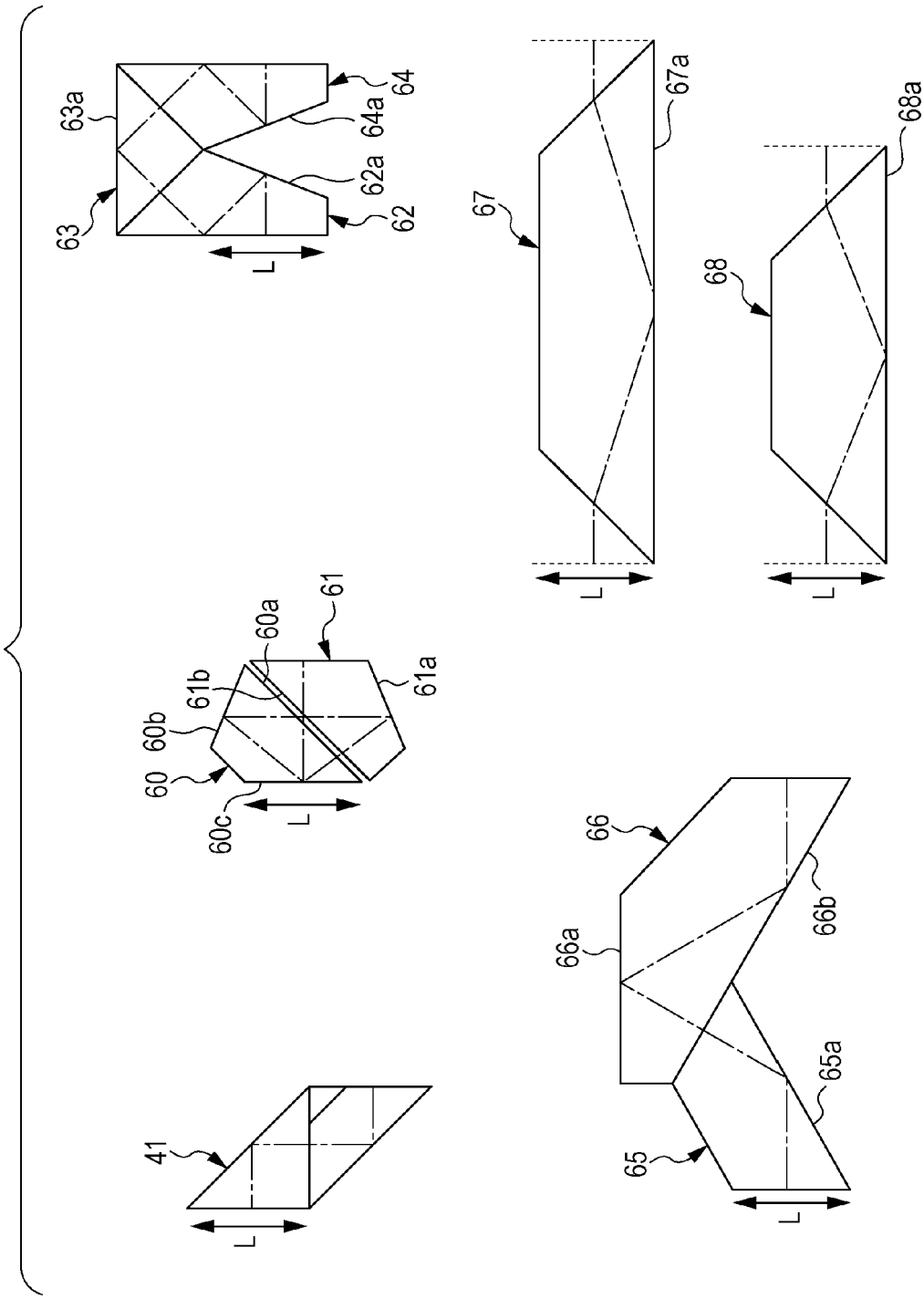
FIG. 3 is a diagram for comparing an optical path length of a conventional prism and an optical path length of the prism used in the first exemplary embodiment.

FIG. 3 is a diagram for comparing the in-prism optical path length of the prism 41 for reflecting light the odd number of times (three times) used in the present exemplary embodiment and the in-prism optical path lengths of conventional prisms for reflecting light the odd number of times. The prism 41 used in the present exemplary embodiment has an in-prism optical path length of 2 L, in which L represents the length of the exit surface (the length along the direction connecting the first optical axis 83 and the second optical axis 84). The air-equivalent optical path length is 2 L/Ndp, in which Ndp represents the refractive index of the prism.

In contrast, the conventional prisms for reflecting light the odd number of times that can rotate an image about an optical axis have a longer in-prism optical path than the prism 41 according to the present exemplary embodiment. A Pechan prism constituted by a prism 60 for reflecting light three times and a prism 61 for reflecting light twice has an in-prism optical path length of 4.6 L, in which L represents the length of the exit surface of the prism (the length along the direction connecting the first optical axis 83 and the second optical axis 84).

In addition, a prism constituted by a prism 62 for reflecting light twice, a prism 63 for reflecting light once, and a prism 64 for reflecting light twice has an in-prism optical path length of 4.4 L, in which L represents the length of the exit surface of the prism (the length along the direction connecting the first optical axis 83 and the second optical axis 84). Furthermore, a prism constituted by a prism 65 for reflecting light once and a prism 66 for reflecting light twice has an in-prism optical path length of 5.2 L, in which L represents the length of the exit surface of the prism (the length along the direction connecting the first optical axis 83 and the second optical axis 84).

When a Dove prism 67 in which light is reflected once at a prism surface has a refractive index of 1.51633, the in-prism optical path length is 3.4 L, in which L represents the length of the exit surface of the prism (the length along the direction connecting the first optical axis 83 and the second optical axis 84). However, when a Dove prism is used, the incident surface and the exit surface are inclined at 45° relative to the optical axis, and thus interference occurs between the prism and lenses disposed across the prism. Therefore, a space of 0.5 L needs to be provided from each of the incident surface and the exit surface, which results in a necessary optical path length of 4.4 L.

When a Dove prism 68 in which light is reflected once at a prism surface has a refractive index of 1.7725, the in-prism optical path length is 2.7 L, in which L represents the length of the exit surface of the prism (the length along the direction connecting the first optical axis 83 and the second optical axis 84). However, when a Dove prism is used, the incident surface and the exit surface are inclined at 45° relative to the optical axis, and thus interference occurs between the prism and lenses disposed across the prism. Therefore, a space of 0.5 L needs to be provided from each of the incident surface and the exit surface, which results in a necessary optical path length of 3.7 L.

With a Dove prism, the incident surface and the exit surface are inclined at 45° relative to the optical axis, which leads to a problem in that a decentered magnification color (color misregistration on the optical axis) occurs and astigmatism occurs. Therefore, it is not suitable to dispose a Dove prism inside an optical system.

According to the present exemplary embodiment, the in-prism optical path length of a prism for reflecting light the odd number of times, which is necessary for rotating an image, can be reduced greatly as compared with a conventional technique, and thus the present exemplary embodiment provides an advantage in the design when an optical system that includes a projection lens is designed concretely. In addition, according to the present exemplary embodiment, an image rotating prism that requires a short optical path length can be disposed inside an optical system, and thus a projection optical system that can rotate an image projected on a screen, that is reduced in size, and that can easily exhibit the optical performance as a projection optical system can be achieved.

Second Exemplary Embodiment

Figure 4:
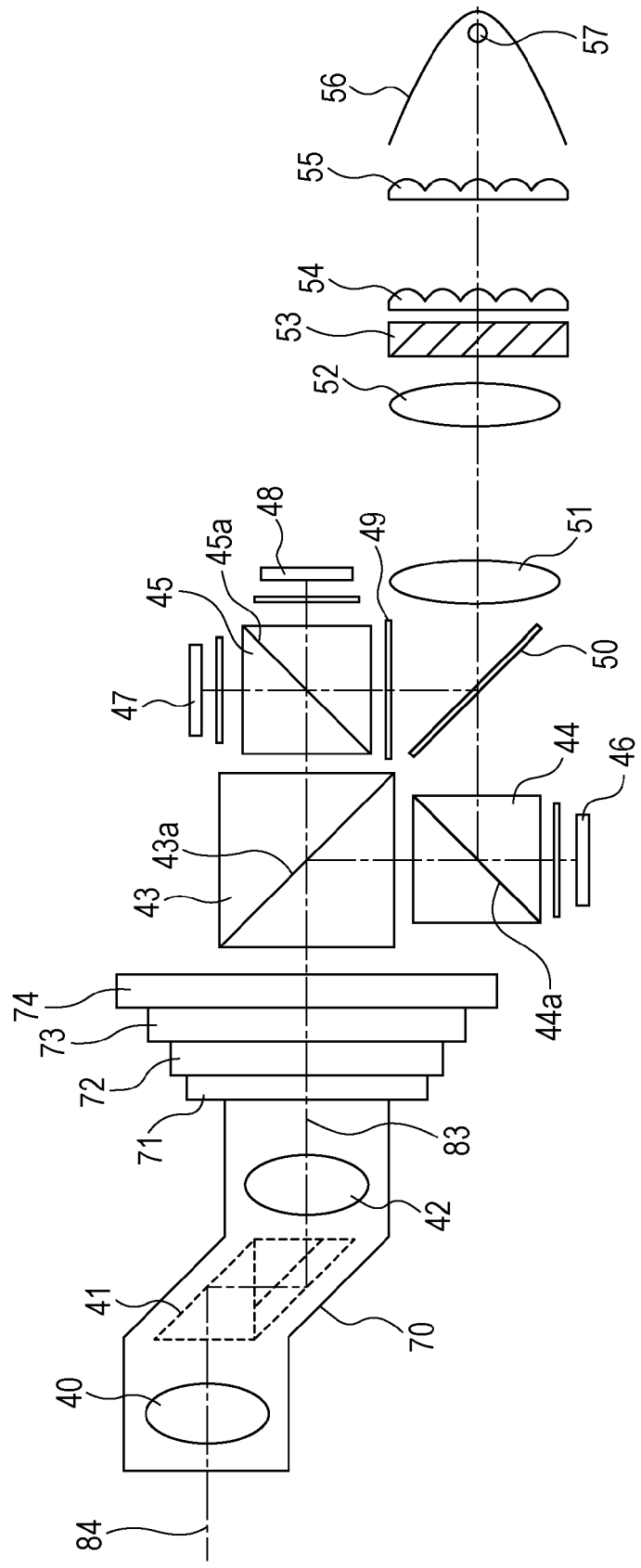
FIG. 4 illustrates a configuration (side view) of an image projection apparatus that includes an optical system according to a second exemplary embodiment.
Figure 5:
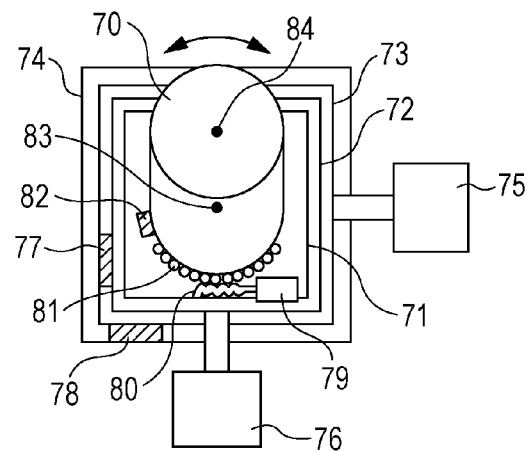
FIG. 5 illustrates a configuration (front view) of the image projection apparatus that includes the optical system according to the second exemplary embodiment.

FIGS. 4 and 5 illustrate a configuration of a second exemplary embodiment of the present invention. In the present exemplary embodiment, a projection lens 70 in which a prism 41 for reflecting light three times according to the first exemplary embodiment (FIGS. 1 and 2) is embedded is provided in a similar manner. In addition, in the present exemplary embodiment, as illustrated in FIG. 5, the projection lens 70 is connected, via a mount unit 71, to a fixing plate 74 by a plate 72 that can be moved in a vertical direction and a plate 73 that can be moved in a horizontal direction. Through this, the projection lens 70 can be shifted within a plane orthogonal to the optical axis.

The projection lens 70 is configured to be rotatable by the following driving system about an optical axis (first optical axis) 83 on the reduction conjugate side. Specifically, in FIG. 5, a worm wheel 81 is formed around a lens barrel of the projection lens 70 on the reduction conjugate side, and a worm gear 80 that meshes with the worm wheel 81 is rotated by a motor 79. In this manner, the projection lens 70 can be rotated about the optical axis 83.

In the present exemplary embodiment, a drive control unit is provided that drives and controls a shift mechanism for translating the projection lens 70 (including the prism 41 and an optical member on an optical path side closer to the screen than at least the prism 41) so as to correct a shift in a rotated projected image. The shift mechanism as referred to herein includes the mount unit 71, the plate 72, the plate 73, and the fixing plate 74.

Figure 6:
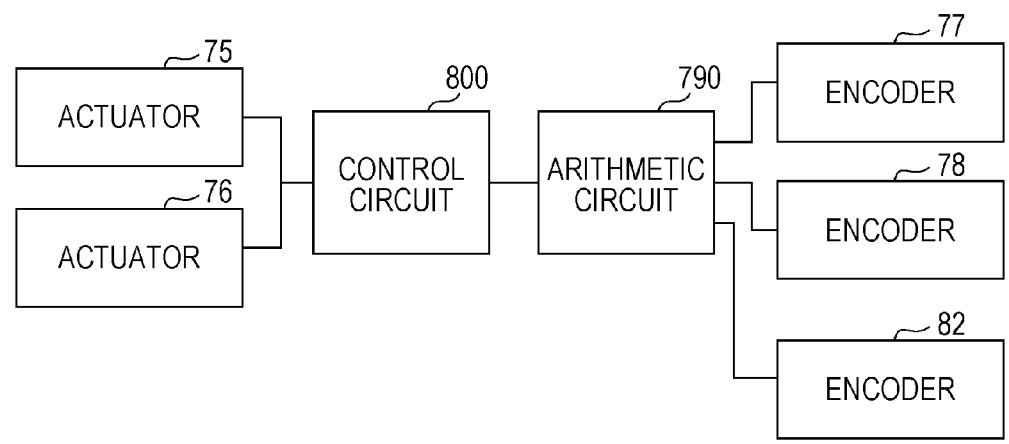
FIG. 6 is a block diagram of an electric circuit according to the second exemplary embodiment.

FIG. 6 illustrates a block diagram of an electric circuit related to the drive control unit that drives and controls the shift mechanism according to the present exemplary embodiment. The shift in the projected image upon the projection lens 70 being rotated is corrected as follows. Specifically, an arithmetic circuit 790 makes a calculation on the basis of information from an encoder 77 that outputs the positional information of the shift in the vertical direction, an encoder 78 that outputs the positional information of the shift in the horizontal direction, and an encoder 82 that outputs the current positional information of the rotation of the projection lens.

Then, on the basis of the result of the calculation by the arithmetic circuit 790, a control circuit 800 serving as the drive control unit drives and controls the shift mechanism as follows. Specifically, an actuator 76 for the lens shift in the vertical direction and an actuator 75 for the lens shift in the horizontal direction are moved such that the center position of the image projected on the screen does not move upon the image being rotated from the center position held before the image is rotated.

According to the present exemplary embodiment, the shift mechanism is controlled such that the center of the projected image does not move upon the image being rotated, and thus even if the projection of a landscape screen and the projection of a portrait screen are switched in an alternating manner, the center of the image projected on the screen can always be fixed, which renders it unnecessary to carry out a shift adjustment depending on whether a projected image is portrait or landscape.

The drive control of this shift mechanism is carried out on the basis of the shift information (displacement amount between the first optical axis and the center of the display unit of the image display element) of the optical system that includes the image rotating prism before the optical system is rotated, the rotation information, and the displacement amount between the first optical axis and the second optical axis. Furthermore, a distance measuring device for measuring the distance from the front end of the projection lens 70 to the screen may additionally be provided, and the correction may be made by calculating the projection magnification of the projection lens 70.

Figure 7:
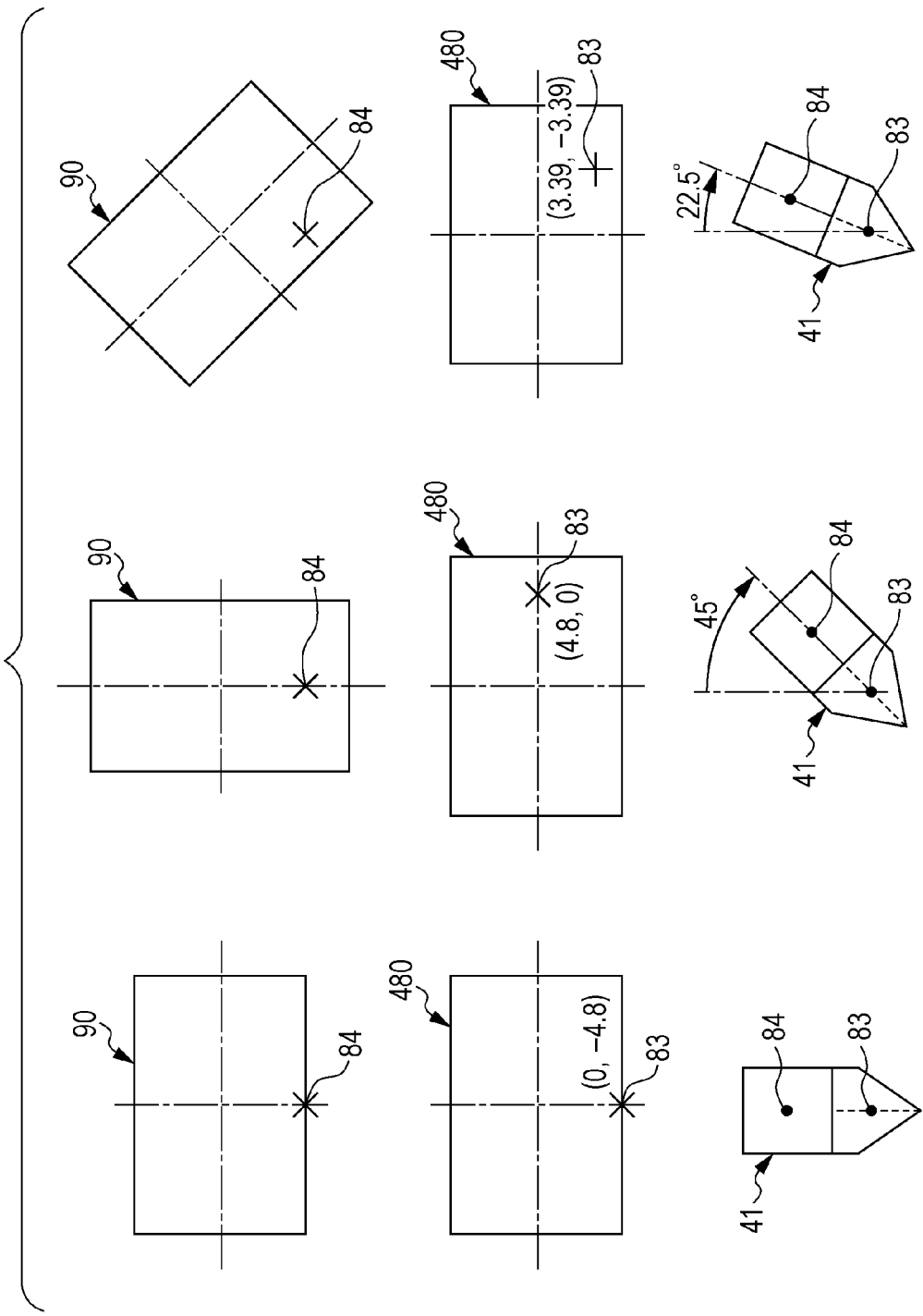
FIG. 7 illustrates a correspondence among the positional relationship between an optical axis and an image projected on a screen, the positional relationship between the optical axis and a display position on a liquid crystal panel, and the state of rotation of a prism about the optical axis according to the first and second exemplary embodiments.

FIG. 7 illustrates, sequentially from the upper side, the rotation state of an image projected on the screen according to the present exemplary embodiment, an image display range on a liquid crystal panel, and the relationship between the first and second optical axes and the rotation state of the prism. The dimensions of the image display range on the liquid crystal panel are 9.6 mm (vertical direction) by 15.36 mm (horizontal direction).

In FIG. 7, a projected image 90 on the left side of the paper plane is projected in landscape orientation, and the projection lens 70 is shifted such that an optical axis (second optical axis) 84 of the projection lens 70 is located at a lower end of the projected image 90. In this case, an optical axis (first optical axis) 83 of the projection lens 70 is located at a lower end of the image display range 480 of the liquid crystal panel. This state illustrated on the left side of the paper plane corresponds to a state in which the prism 41 is not inclined. When the coordinates of the center of the image display range 480 of the liquid crystal panel are (0,0), the coordinates of the optical axis (first optical axis) 83 of the projection lens 70 on the reduction conjugate side (liquid crystal panel side) are (0, −4.8) (shifted by 50% toward the top in landscape display).

In FIG. 7, illustrated in the middle of the paper plane is the state to be obtained when the prism 41 is inclined at 45° in a clockwise direction, and the image projected on the screen is rotated by 90° in a clockwise direction. Thus, the lens shift mechanism may be moved such that the optical axis (first optical axis) 83 of the projection lens 70 is located to the right of the center of the image display range 480 on the liquid crystal panel. In other words, the projected image 90 can be rotated without moving the center of the projected image on the screen.

When the coordinates of the center of the image display range 480 of the liquid crystal panel are (0,0), the coordinates of the optical axis 83 of the projection lens 70 on the reduction conjugate side (liquid crystal panel side) are (4.8,0) (shifted by 31.25% toward the top in portrait display).

In FIG. 7, illustrated on the right side of the paper plane is the state to be obtained when the prism 41 is inclined at 22.5° in a clockwise direction, and the image projected on the screen is rotated by 45° in a clockwise direction. Thus, the lens shift mechanism may be moved such that the optical axis 83 of the projection lens is located to the lower right of the center of the image display range 480 on the liquid crystal panel. In other words, the projected image 90 can be rotated without moving the center of the projected image on the screen. When the coordinates of the center of the image display range 480 of the liquid crystal panel are (0,0), the coordinates of the optical axis 83 of the projection lens 70 on the reduction conjugate side (liquid crystal panel side) are (3.39, −3.39) (inclined at 45°).

Third Exemplary Embodiment

Figure 8:
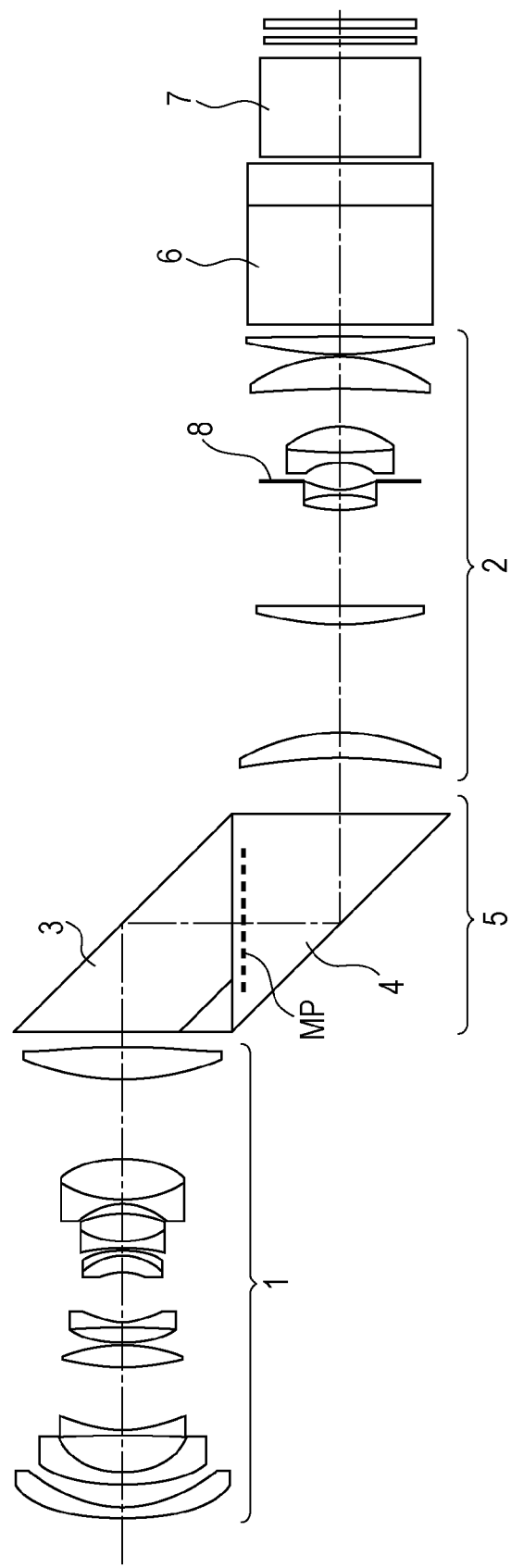
FIG. 8 illustrates a configuration (sectional view) of an image projection apparatus that includes an optical system according to a third exemplary embodiment (first numerical example).

FIG. 8 illustrates a sectional view of a lens according to a third exemplary embodiment of the present invention, which corresponds to a first numerical example. The first numerical example is a reimaging optical system constituted by, from the side of the screen, a first lens unit 1 having a positive refractive power, an image rotating prism 5 in which a roof prism (Amici prism) 3 having a vertical angle of 90° and a triangular prism 4 are bonded, a second lens unit 2 having a positive refractive power, and color combining prisms 6 and 7. In the present exemplary embodiment, an intermediate image MP serving as an intermediate imaging surface is formed inside the image rotating prism. Specifically, the intermediate imaging surface (intermediate image MP) is located inside the roof prism 3 or the triangular prism 4 or between the roof prism 3 and the triangular prism 4.

An image displayed on a display unit of a liquid crystal panel 48 is imaged as the intermediate image MP inside the image rotating prism by the second lens unit 2. Then, the image is reflected three times in total inside the image rotating prism 5 and is reimaged on the screen (not illustrated, but located to the left of the paper plane) by the first lens unit 1. Since the image is reflected an odd number of times inside the image rotating prism 5, by integrally rotating the first lens unit 1, the image rotating prism 5, and the second lens unit 2 about an optical axis (first optical axis) of the second lens unit 2, the projected image can be rotated.

Figure 9:
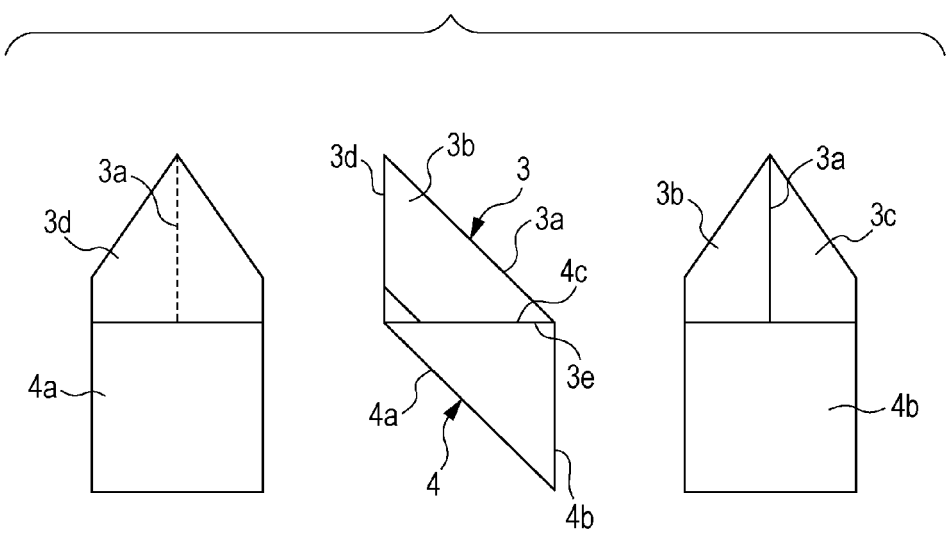
FIG. 9 illustrates a front view, a side view, and a rear view of a prism used in the third exemplary embodiment.

FIG. 9 illustrates, sequentially from the left side, a front view as viewed from the side of the screen, a side view, and a rear view (liquid crystal panel side) of the image rotating prism. The image rotating prism 5 is formed by the roof prism (Amici prism) 3 having a vertical angle of 90° and the triangular prism 4 that are bonded together, and reflection surfaces 3b and 3c are formed on the roof prism (Amici prism) 3 across a ridge line 3a (FIG. 9) of the roof surface. In addition, a reflection surface 4a serving as a total-reflection surface is formed on the triangular prism 4.

This image rotating prism 5 is disposed between the first lens unit 1 and the second lens unit 2, and thus a displacement of 35 mm is produced between an optical axis (second optical axis) of the first lens unit 1 and the optical axis (first optical axis) of the second lens unit 2. However, when this configuration is used in a projector, the displacement of 35 mm between the first and second optical axes is not a problem because the size of a projected image is typically approximately 100 inches (2.54 m) on a side.

In the present exemplary embodiment, the image rotating prism 5 is disposed in the vicinity of the intermediate image MP because the design of a reimaging optical system makes it easy to secure a large lens interval in the vicinity of an intermediate image.

Fourth Exemplary Embodiment

Figure 10:
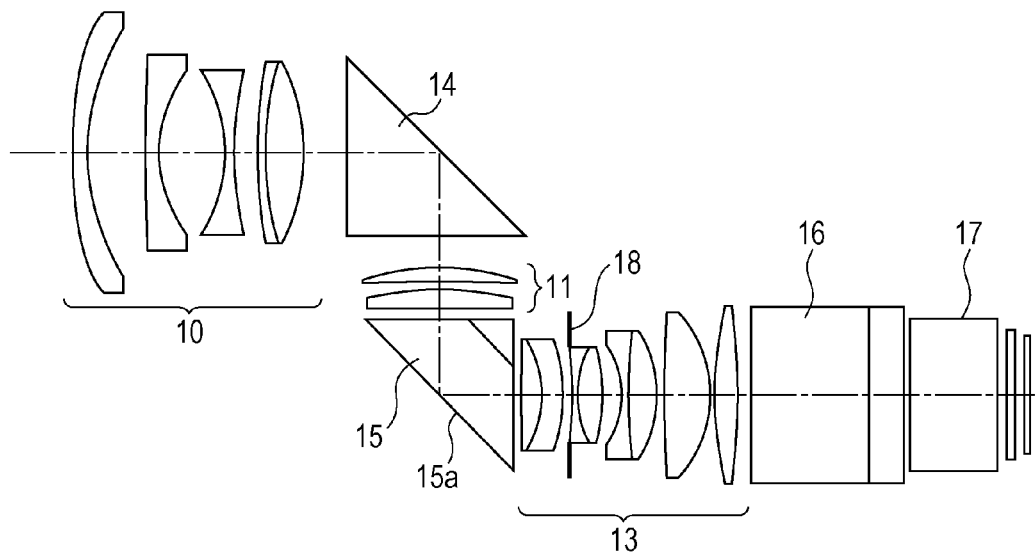
FIG. 10 illustrates a configuration (sectional view) of an image projection apparatus that includes an optical system according to a fourth exemplary embodiment (second numerical example).

FIG. 10 illustrates a sectional view of a lens according to a fourth exemplary embodiment of the present invention, which corresponds to a second numerical example. The second numerical example is constituted by, from the side of the screen, a first lens unit 10 having a negative refractive power, a triangular prism 14, a second lens unit 11 having a positive refractive power, a roof prism (Amici prism) 15, a third lens unit 13 having a positive refractive power, and color combining prisms 16 and 17. The present exemplary embodiment is not a reimaging optical system but is a retro focus lens system as a whole.

In the present exemplary embodiment, an image is reflected once by the triangular prism 14 and reflected twice by the roof surface of the roof prism 15, and the image is thus reflected three times (odd number of times) in total within the optical system. The first lens unit 10, the triangular prism 14, the second lens unit 11, the roof prism 15, and the third lens unit 13 are rotated about the optical axis (first optical axis) of the third lens unit 13. Through this, an image projected on the screen (not illustrated, but located to the left of the paper plane) can be rotated.

In this manner, it is possible to divide an image rotating prism into two parts and to dispose the two parts (as separate entities) with a lens unit (at least one positive lens) interposed therebetween, and this can be applied even in a case in which it is not easy to secure a large lens interval in a lens system.

It is desirable that the second lens unit 11 disposed between the triangular prism 14 and the roof prism 15 in the present exemplary embodiment have a positive refractive power in order to suppress a divergence of an optical path within the two prisms disposed across the second lens unit 11 in the optical path.

Fifth Exemplary Embodiment

Figure 11A:
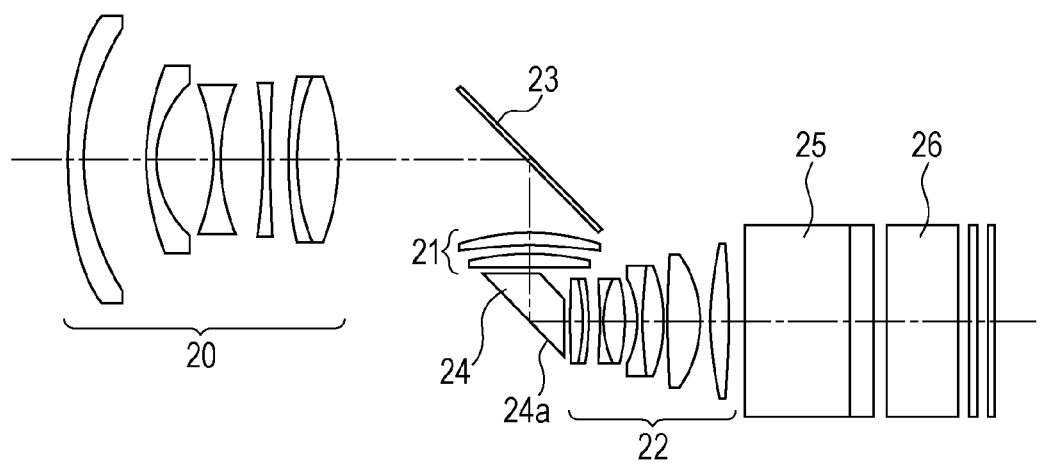
FIG. 11A illustrates a configuration (sectional view) of an image projection apparatus that includes an optical system according to a fifth exemplary embodiment (third numerical example)

FIG. 11A illustrates a sectional view of a lens according to a fifth exemplary embodiment of the present invention, which corresponds to a third numerical example. The third numerical example is constituted by, from the side of the screen, a first lens unit 20 having a negative refractive power, a reflection mirror 23, a second lens unit 21 having a positive refractive power, a roof mirror 24, a third lens unit 22 having a positive refractive power, and color combining prisms 25 and 26.

Figure 11B:
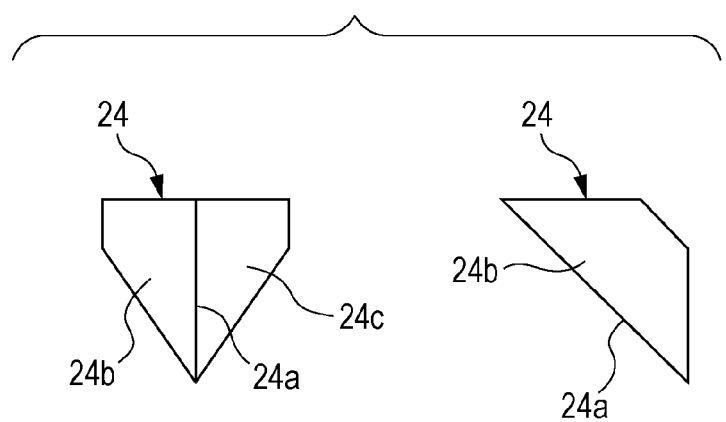
FIG. 11B illustrates a side view and a rear view of a roof mirror according to the fifth exemplary embodiment.

In the present exemplary embodiment, an image is reflected once by the reflection mirror 23 in the optical system and reflected twice by the roof mirror 24 (reflected by reflection surfaces 24b and 24c illustrated in FIG. 11B), and the image is thus reflected three times (odd number of times) in total. Thus, the image can be rotated. Specifically, the first lens unit 20 having a negative refractive power, the reflection mirror 23, the second lens unit 21 having a positive refractive power, the roof mirror 24, and the third lens unit 22 having a positive refractive power are integrated and rotated about the optical axis (first optical axis) of the third lens unit 22. Through this, an image projected on the screen (not illustrated, but located to the left of the paper plane) can be rotated.

In this manner, when there is room for a lens interval inside an optical system, as in the present exemplary embodiment, the present invention can be applied even with a configuration constituted not by a prism but by a reflection mirror and a roof mirror. As in the fourth exemplary embodiment, the present exemplary embodiment is not a reimaging optical system but is a retro focus lens system as a whole.

Sixth Exemplary Embodiment

Figure 12:
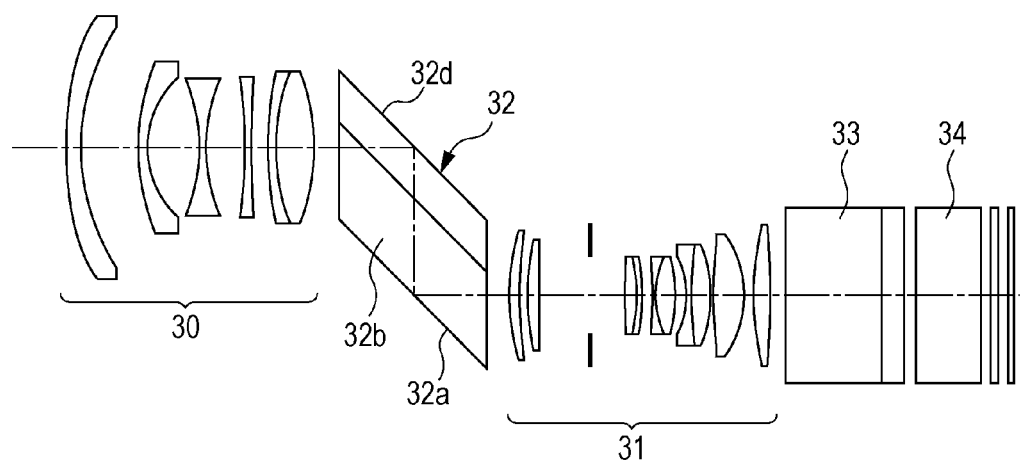
FIG. 12 illustrates a configuration (sectional view) of an image projection apparatus that includes an optical system according to a sixth exemplary embodiment (fourth numerical example).
Figure 13:
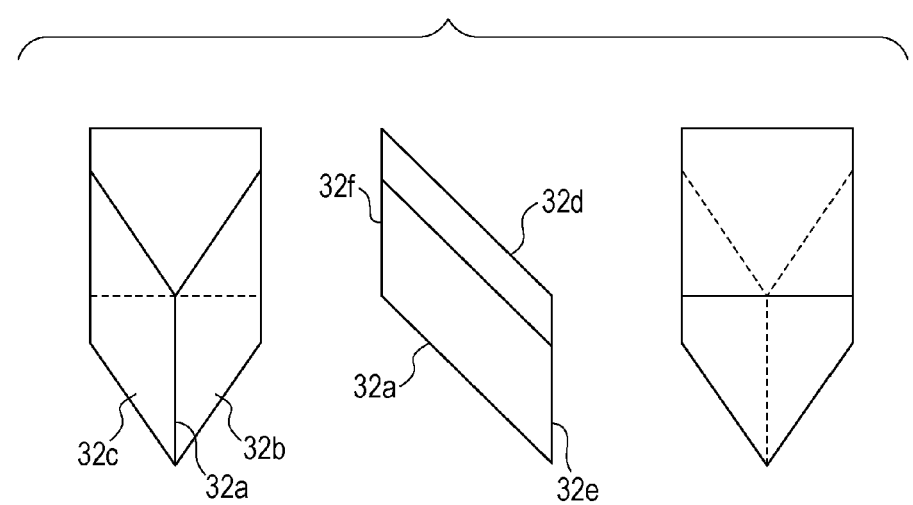
FIG. 13 illustrates a front view, a side view, and a rear view of a prism used in the sixth exemplary embodiment.
Figure 14:
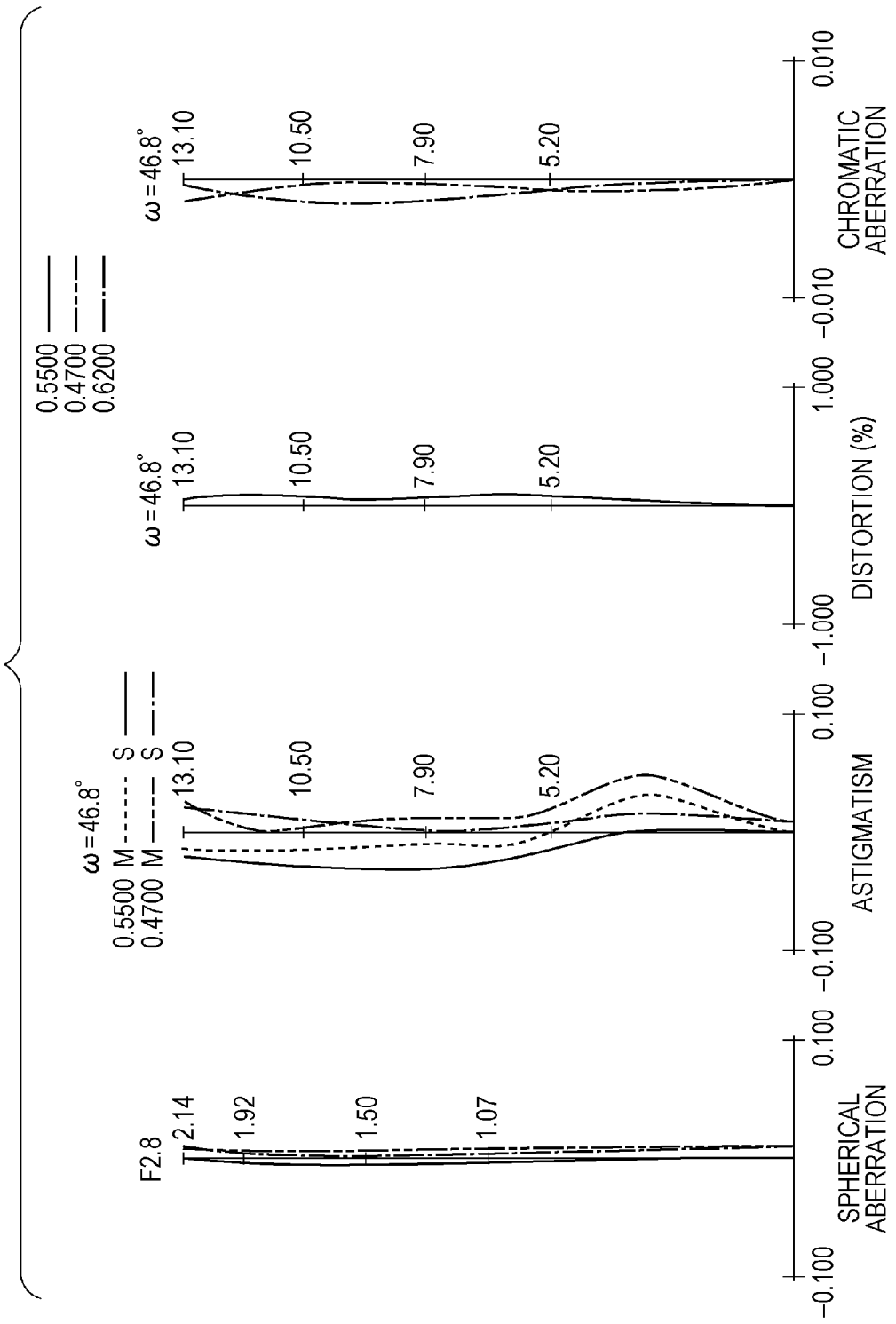
FIG. 14 is an aberration diagram according to the first numerical example.
Figure 15:
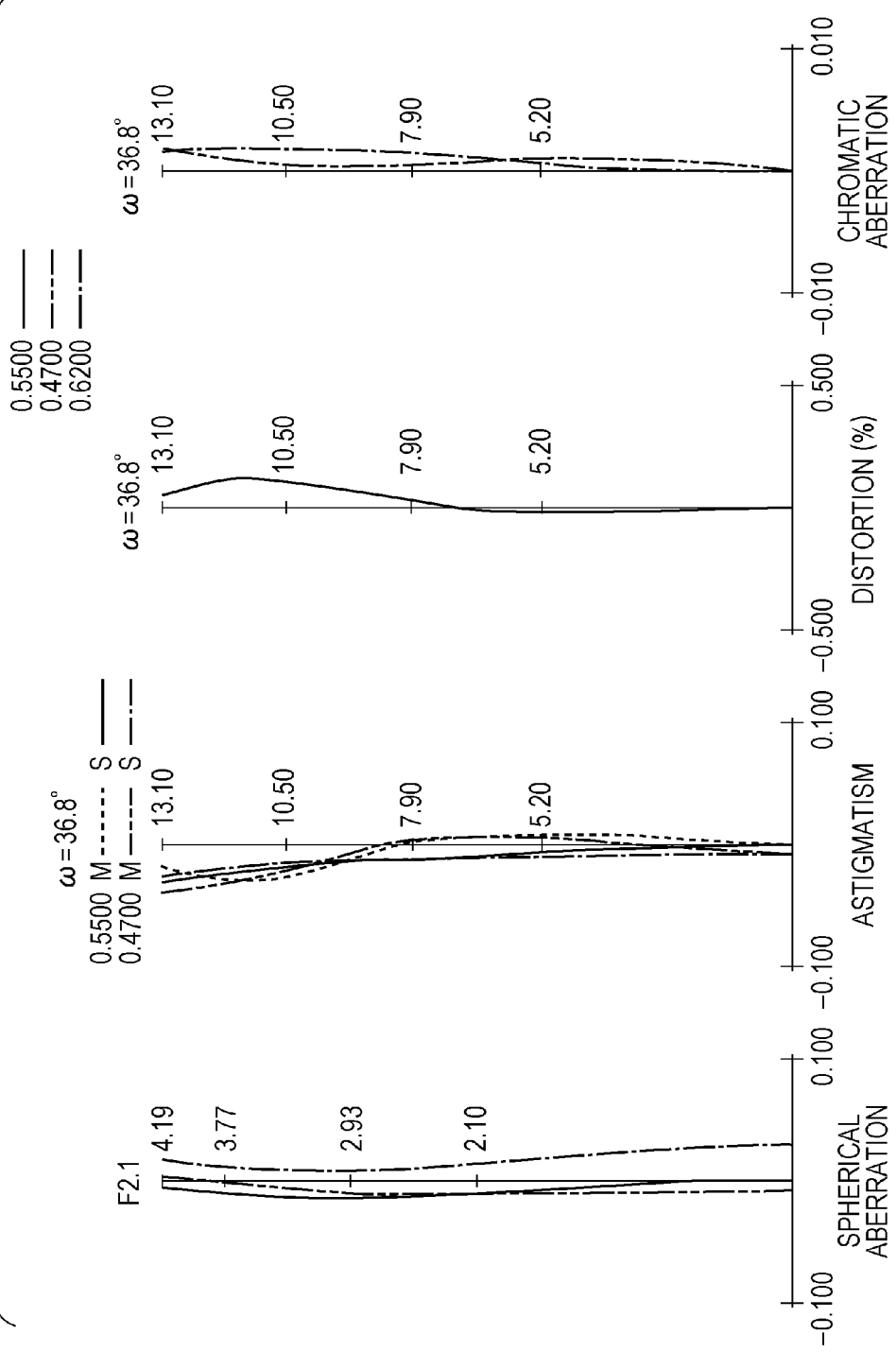
FIG. 15 is an aberration diagram according to the second numerical example.
Figure 16:
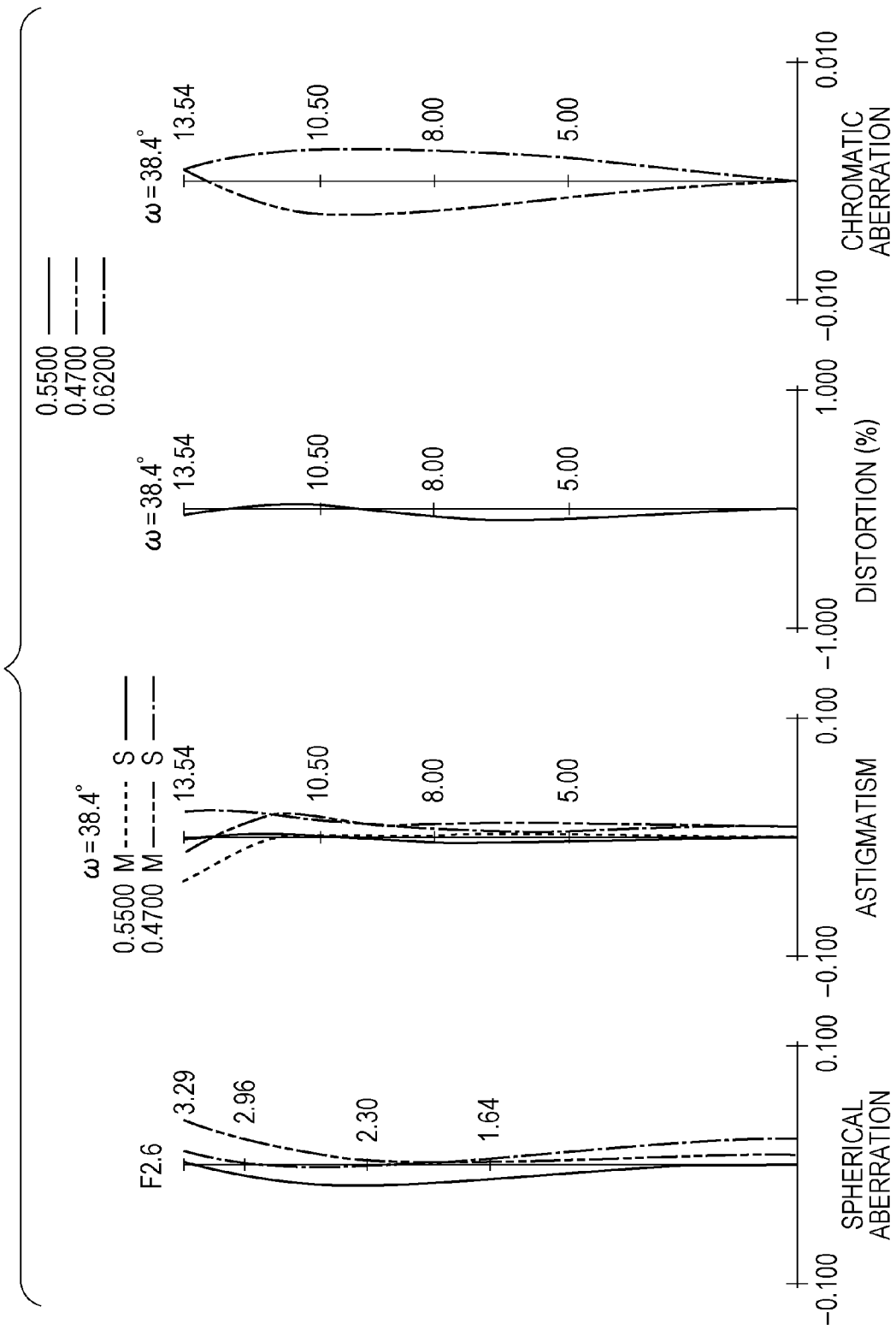
FIG. 16 is an aberration diagram according to the third numerical example.
Figure 17:
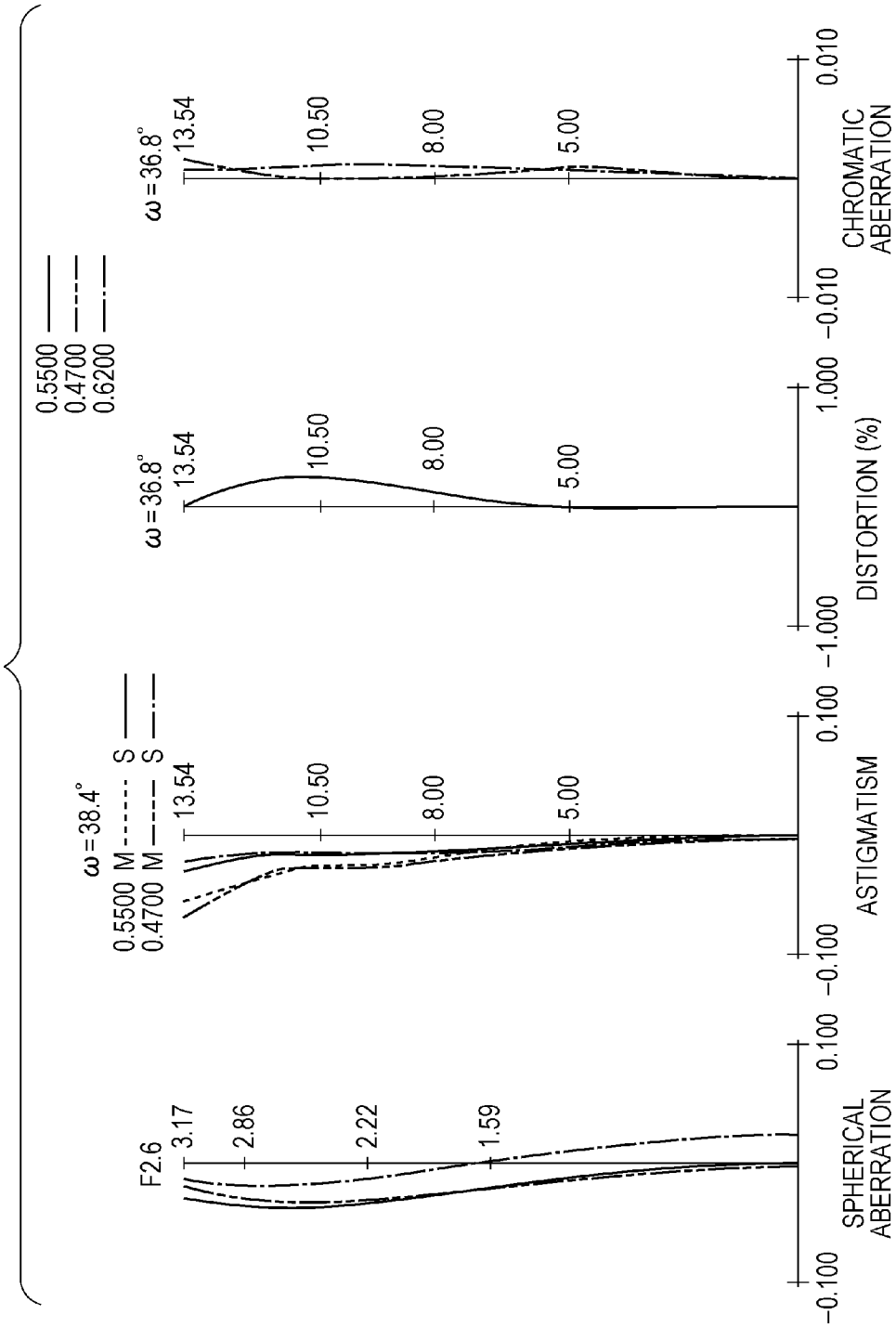
FIG. 17 is an aberration diagram according to the fourth numerical example.

FIG. 12 illustrates a sectional view of a lens according to a sixth exemplary embodiment of the present invention, which corresponds to a fourth numerical example. The fourth numerical example is constituted by a first lens unit 30 having a negative refractive power, an image rotating prism 32 having a first reflection surface 32b and a second reflection surface 32c that are positioned with a vertical angle of 90° (FIG. 13) and a third reflection surface 32d, a second lens unit 31 having a positive refractive power, and color combining prisms 33 and 34.

In the present exemplary embodiment, an image is reflected three times in total in the image rotating prism 32, and thus the image can be rotated. Specifically, the first lens unit 30 having a negative refractive power, the image rotating prism 32 with a roof reflection surface (first reflection surface and second reflection surface) having a vertical angle of 90° and a reflection surface (third reflection surface) for reflecting light once, and the second lens unit 31 having a positive refractive power are integrated and rotated about the optical axis (first optical axis) of the second lens unit 31. Through this, an image projected on the screen (not illustrated, but located to the left of the paper plane) can be rotated.

As in the present exemplary embodiment, by forming the image rotating prism 32 by a single prism, the cost of the prism can be reduced. As in the fourth and fifth exemplary embodiments, the present exemplary embodiment is not a reimaging optical system but is a retro focus lens system as a whole.

NUMERICAL EXAMPLES

Numerical examples including the design data of the projection lenses are indicated below. A surface that is marked with * indicated to the right of the surface number (surfaces 1 to 4) is an aspherical surface that accords with the following function, in which k is the conic constant, y represents the coordinate in the radial direction, and z represents the coordinate in the optical axis direction. R represents a paraxial radius of curvature. A4, A6, A8, A10, and A12 represent fourth-order, sixth-order, eighth-order, tenth-order, and twelfth-order aspherical coefficients, respectively.

$$z = (y^2/R)/((1+(1-y^2 \cdot k/R^2)^{0.5}) + A4 \cdot y^4 + A6 \cdot y^6 + A8 \cdot y^8 + A10 \cdot y^{10} + A12 \cdot y^{12}$$

First Numerical Example

| Surface Number | Ri | Di | Ni | Vi |
|---|---|---|---|---|
| 1* | 99.946 | 2.175 | 1.65044 | 57.3 |
| 2* | 18.952 | 4.180 | 1 | |
| 3* | 43.629 | 2.495 | 1.77300 | 49.6 |
| 4* | 24.055 | 6.783 | 1 | |

-continued

| | | | | |
|---|---|---|---|---|
| 5 | −114.967 | 1.0 | 1.53603 | 65.0 |
| 6 | 20.589 | 11.645 | 1 | |
| 7 | 42.658 | 3.841 | 1.75241 | 50.96 |
| 8 | −32.635 | 0.516 | 1 | |
| 9 | 20.329 | 2.90 | 1.92286 | 18.9 |
| 10 | 156.792 | 1.26 | 1.70401 | 29.08 |
| 11 | 15.825 | 9.09 | 1 | |
| 12 | −22.691 | 3.28 | 1.70122 | 55.1 |
| 13 | −10.364 | 1.0 | 1.84700 | 23.8 |
| 14 | −128.908 | 0.5 | 1 | |
| 15 | 15.787 | 1.0 | 1.84700 | 23.8 |
| 16 | −18.326 | 1.53 | 1 | |
| 17 | −12.127 | 1.00 | 1.73130 | 27.72 |
| 18 | 29.521 | 7.602 | 1.77292 | 49.6 |
| 19 | −19.743 | 15.075 | 1 | |
| 20 | 41.853 | 5.662 | 1.92286 | 18.9 |
| 21 | 474.328 | 3 | 1 | |
| 22 | ∞ | 70 | 1.77250 | 49.6 |
| 23 | ∞ | 10.62 | 1 | |
| 24 | −515.425 | 4.9 | 1.81038 | 40.99 |
| 25 | −42.315 | 19.923 | 1 | |
| 26 | 36.881 | 3.279 | 1.77313 | 49.56 |
| 27 | 120.492 | 18.517 | 1 | |
| 28 | 26.817 | 2.7 | 1.76727 | 49.96 |
| 29 | −15.223 | 1.093 | 1.65958 | 33.52 |
| 30 | 18.089 | 1.435 | 1 | |
| 31 | ∞ (aperture stop) | 3.538 | 1 | |
| 32 | −11.262 | 1.594 | 1.83517 | 35.39 |
| 32 | 39.954 | 5.0 | 1.70504 | 54.74 |
| 33 | −19.060 | 6.828 | 1 | |
| 34 | −301.177 | 6.29 | 1.78857 | 45.51 |
| 35 | −29.558 | 0.5 | 1 | |
| 36 | 67.400 | 3.286 | 1.80810 | 22.76 |
| 37 | −541.025 | 2.3 | 1 | |
| 38 | ∞ | 22.4 | 1.51633 | 64.14 |
| 40 | ∞ | 7.6 | 1.51633 | 64.14 |
| 41 | ∞ | 1.87 | 1 | |
| 42 | ∞ | 17.7 | 1.80518 | 25.43 |
| 43 | ∞ | 2.98 | 1 | |
| 44 | ∞ | 1.32 | 1.51633 | 64.14 |
| 45 | ∞ | 2.0 | 1 | |
| 46 | ∞ | 1.0 | 1.51633 | 64.14 |
| 47 | ∞ | | | | aspherical coefficient first surface $K = 0$
$A4 = 1.815099e-5$
$A6 = 3.183436e-9$
$A8 = 2.009031e-11$
$A10 = 4.995699e-14$
$A12 = 1.46296e-19$
$A14 = -3.315863e-20$
second surface $K = 0$
$A4 = -8.04228e-5$
$A6 = 1.53768e-7$
$A8 = -4.580296e-11$
$A10 = 3.000607e-13$
$A12 = -2.211947e-15$
$A14 = -2.381162e-19$
third surface $K = 0$
$A4 = 2.680325e-5$
$A6 = -1.091556e-7$
$A8 = -1.91768e-11$
$A10 = 8.651281e-13$
$A12 = -8.8009e-16$
$A14 = -5.234045e-19$
fourth surface $K = 0$
$A4 = 1.567771e-4$
$A6 = -3.476058e-7$
$A8 = 8.56741e-9$ -continued $A10 = -7.787345e-11$
$A12 = 3.074148e-13$
$A14 = 7.961727e-17$
focal length 12.3 mm
F-number 2.8

Second Numerical Example

| Surface Number | Ri | Di | Ni | Vi |
|---|---|---|---|---|
| 1* | 487.289 | 3.0 | 1.51633 | 64.14 |
| 2 | 52.641 | 13.56 | 1 | |
| 3* | 180.128 | 3.0 | 1.77250 | 49.6 |
| 4 | 29.893 | 15.67 | 1 | |
| 5 | −32.660 | 1.8 | 1.49700 | 81.54 |
| 6 | 72.608 | 5.746 | 1 | |
| 7 | 125.082 | 1.9 | 1.92286 | 18.9 |
| 8 | 74.276 | 8.6 | 1.72047 | 34.7 |
| 9 | −46.872 | 10.0 | 1 | |
| 10 | ∞ | 41 | 1.77250 | 49.6 |
| 11 | ∞ | 8.016 | 1 | |
| 12 | 59.360 | 3.3 | 1.54814 | 45.79 |
| 13 | −2485.014 | 2.005 | 1 | |
| 14 | 101.232 | 4.1 | 1.69895 | 30.13 |
| 15 | 2435.303 | 2.768 | 1 | |
| 16 | ∞ | 34 | 1.77250 | 49.6 |
| 17 | ∞ | 2.0 | 1 | |
| 18 | 990.012 | 4.7 | 1.51633 | 64.14 |
| 19 | −23.423 | 4.9 | 1.88300 | 40.76 |
| 20 | −34.117 | 1.505 | 1 | |
| 21 | ∞ (aperture stop) | 0.6 | 1 | |
| 22 | −72.725 | 1.1 | 1.85026 | 32.27 |
| 23 | 22.779 | 5.9 | 1.51633 | 64.14 |
| 24 | −49.448 | 4.616 | 1 | |
| 25 | −20.431 | 1.3 | 1.85026 | 32.27 |
| 26 | 106.857 | 6.9 | 1.51633 | 64.14 |
| 27 | −26.872 | 1.71 | 1 | |
| 28 | 292.247 | 10.5 | 1.43875 | 94.93 |
| 29 | −29.000 | 1.0 | 1 | |
| 30 | 82.075 | 5.3 | 1.80810 | 22.76 |
| 31 | −197.994 | 2.751 | 1 | |
| 32 | ∞ | 28.0 | 1.51633 | 64.14 |
| 33 | ∞ | 7.82 | 1.51633 | 64.14 |
| 34 | ∞ | 2.044 | 1 | |
| 35 | ∞ | 19.5 | 1.80518 | 25.43 |
| 36 | ∞ | 3.1 | 1 | |
| 37 | ∞ | 1.32 | 1.51633 | 64.14 |
| 38 | ∞ | 2.08 | 1 | |
| 39 | ∞ | 0.7 | 1.51633 | 64.14 |
| 40 | ∞ | | | | aspherical coefficient first surface $K = 0$
$A4 = 7.466424e-6$
$A6 = -5.685039e-9$
$A8 = 6.27502e-12$
$A10 = -4.073371e-15$
$A12 = 1.543664e-18$
second surface $K = 0$
$A4 = -5.422423e-6$
$A6 = 5.410367e-9$
$A8 = -1.21441e-12$
$A10 = -6.57542e-15$
$A12 = 6.975096e-18$
focal length 17.5 mm
F-number 2.1

Third Numerical Example

| Surface Number | Ri | Di | Ni | Vi |
|---|---|---|---|---|
| 1 | 174.392 | 4.2 | 1.51633 | 64.14 |
| 2 | 62.856 | 17.0 | 1 | |
| 3 | 64.879 | 2.6 | 1.713 | 53.87 |
| 4 | 26.747 | 15.6 | 1 | |
| 5 | −46.171 | 2.0 | 1.49700 | 81.54 |
| 6 | 52.340 | 11.408 | 1 | |
| 7 | −150.600 | 2.0 | 1.74400 | 44.78 |
| 8 | 346.851 | 4.782 | 1 | |
| 9 | 99.287 | 2.3 | 1.92286 | 20.88 |
| 10 | 56.193 | 11.5 | 1.67300 | 38.15 |
| 11 | −56.193 | 69.813 | 1 | |
| 12 | 71.947 | 3.3 | 1.58913 | 61.14 |
| 13 | 141.375 | 2.119 | 1 | |
| 14 | 80.940 | 3.55 | 1.80518 | 25.46 |
| 15 | −5606.356 | 15.154 | 1 | |
| 16 | ∞ (aperture stop) | 9.534 | 1 | |
| 17 | 368.763 | 3.7 | 1.51633 | 64.14 |
| 18 | −38.620 | 1.3 | 1.90366 | 31.32 |
| 19 | −63.551 | 2.952 | 1 | |
| 20 | −155.343 | 1.2 | 1.90336 | 31.32 |
| 21 | 28.776 | 5.9 | 1.51633 | 64.14 |
| 22 | −41.875 | 3.305 | 1 | |
| 23 | −24.146 | 1.3 | 1.90366 | 31.32 |
| 24 | 96.004 | 5.75 | 1.51633 | 64.14 |
| 25 | −41.868 | 1.3 | 1 | |
| 26 | 562.451 | 8.75 | 1.49700 | 81.54 |
| 27 | −29.109 | 2.682 | 1 | |
| 28 | 93.214 | 5.0 | 1.80810 | 22.76 |
| 29 | −196.89 | 4.392 | 1 | |
| 30 | ∞ | 28.0 | 1.51633 | 64.14 |
| 31 | ∞ | 6.82 | 1.51633 | 64.14 |
| 32 | ∞ | 3.43 | 1 | |
| 33 | ∞ | 19.5 | 1.80518 | 25.43 |
| 34 | ∞ | 2.9 | 1 | |
| 35 | ∞ | 2.08 | 1.51633 | 64.14 |
| 36 | ∞ | 2.92 | 1 | |
| 37 | ∞ | 0.7 | 1.46 | 46.68 |
| 38 | ∞ | 1.1 | 1.51 | 51.62 |
| 39 | ∞ | | | | aspherical coefficient first surface

K = 0
A4 = 2.74724e−6
A6 = −8.766462e−10
A8 = 6.150328e−13
A10 = −2.654043e−16
A12 = 7.683658e−20 third surface

K = 0
A4 = −2.13015e−6
A6 = −5.750979e−11
A8 = 1.458415e−12
A10 = −1.127914e−15
A12 = −2.566706e−19
focal length 17.1 mm
F-number 2.6

Fourth Numerical Example

| Surface Number | Ri | Di | Ni | Vi |
|---|---|---|---|---|
| 1 | 174.393 | 4.2 | 1.51633 | 64.14 |
| 2 | 65.195 | 17.0 | 1 | |
| 3 | 55.879 | 2.6 | 1.713 | 53.87 |
| 4 | 27.209 | 15.6 | 1 | |
| 5 | −45.789 | 2.0 | 1.49700 | 81.54 |
| 6 | 66.406 | 11.408 | 1 | |
| 7 | −138.782 | 2.0 | 1.74400 | 44.78 |
| 8 | 173.794 | 4.782 | 1 | |
| 9 | 118.902 | 2.3 | 1.92286 | 20.88 |
| 10 | 60.594 | 11.5 | 1.67300 | 38.15 |
| 11 | −54.005 | 6.5 | 1 | |
| 12 | ∞ | 86.0 | 1.51633 | 64.14 |
| 13 | ∞ | 6.597 | 1 | |
| 12 | 71.612 | 3.3 | 1.58913 | 61.14 |
| 13 | 135.951 | 2.119 | 1 | |
| 14 | 72.923 | 3.55 | 1.80518 | 25.46 |
| 15 | −10224.832 | 15.154 | 1 | |
| 16 | ∞ (aperture stop) | 9.534 | 1 | |
| 17 | 291.170 | 3.7 | 1.51633 | 64.14 |
| 18 | −37.087 | 1.3 | 1.90366 | 31.32 |
| 19 | −62.550 | 2.952 | 1 | |
| 20 | −155.343 | 1.2 | 1.90336 | 31.32 |
| 21 | 27.817 | 5.9 | 1.51633 | 64.14 |
| 22 | −41.041 | 3.305 | 1 | |
| 23 | −25.500 | 1.3 | 1.90366 | 31.32 |
| 24 | 77.137 | 5.75 | 1.51633 | 64.14 |
| 25 | −50.713 | 1.3 | 1 | |
| 26 | 281.196 | 8.75 | 1.49700 | 81.54 |
| 27 | −29.739 | 2.682 | 1 | |
| 28 | 85.243 | 5.0 | 1.80810 | 22.76 |
| 29 | −249.049 | 4.392 | 1 | |
| 30 | ∞ | 28.0 | 1.51633 | 64.14 |
| 31 | ∞ | 6.82 | 1.51633 | 64.14 |
| 32 | ∞ | 3.43 | 1 | |
| 33 | ∞ | 19.5 | 1.80518 | 25.43 |
| 34 | ∞ | 2.9 | 1 | |
| 35 | ∞ | 2.08 | 1.51633 | 64.14 |
| 36 | ∞ | 2.92 | 1 | |
| 37 | ∞ | 0.7 | 1.46 | 46.68 |
| 38 | ∞ | 1.1 | 1.51 | 51.62 |
| 39 | ∞ | | | | aspherical coefficient first surface

K = 0
A4 = 2.74724e−6
A6 = −8.766462e−10
A8 = 6.150328e−13
A10 = −2.654043e−16
A12 = 7.683658e−20 third surface

K = 0
A4 = −2.13015e−6
A6 = −5.750979e−11
A8 = 1.458415e−12
A10 = −1.127914e−15
A12 = −2.566706e−19
focal length 17.1 mm
F-number 2.6

FIGS. 14, 15, 16, and 17 are aberration diagrams of the first, second, third, and fourth numerical examples, respectively.

Modifications

In the exemplary embodiments described above, preferred exemplary embodiments of the present invention have been described, but the present invention is not limited to these exemplary embodiments, and various modifications can be made within the scope of the spirit of the present invention.

First Modification

Although a reflection surface for reflecting light once that opposes the ridge line of the vertex of the roof surface and that is parallel to the ridge line is illustrated in the exemplary embodiments described above, the present invention is not limited thereto. Such a reflection surface may be a reflection surface for reflecting light once that is rotated about the axis of incident light and that is orthogonal to the ridge line or in torsion relative to the ridge line.

Figure 18A:
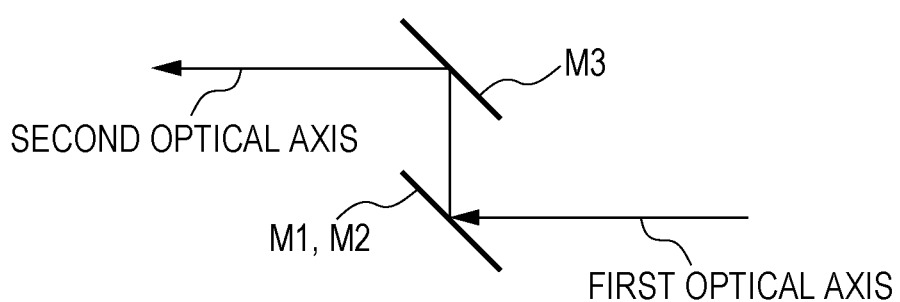
FIGS. 18A and 18B are illustrations for describing a configuration according to a modification.
Figure 18B:
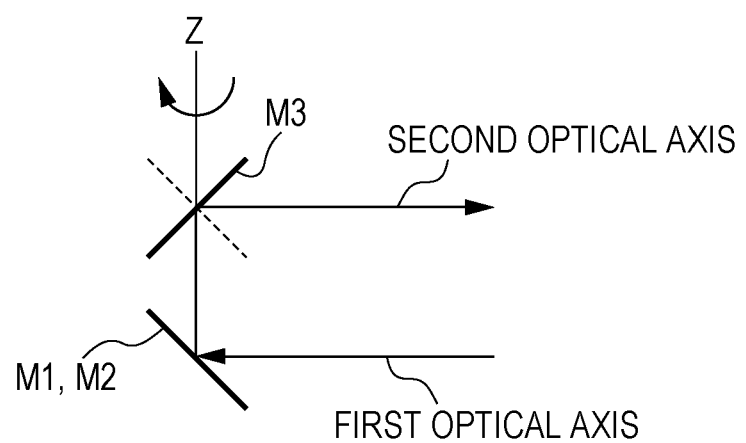

This will be described in further detail with reference to FIGS. 18A and 18B. In FIGS. 18A and 18B, the roof surface is represented simply by reflection surfaces M1 and M2, and a reflection surface that opposes the roof surface is represented simply by M3 for convenience. In FIG. 18A, the reflection surfaces M1, M2, and M3 are integrally rotatable about a first optical axis. In FIG. 18B, as compared with FIG. 18A, the reflection surface M3 is rotationally displaced about the axis Z of the light incident on the reflection surface M3 (the rotational displacement angle is 180°), and the direction of the second optical axis on the exit side is different from that illustrated in FIG. 18A. In FIG. 18B as well, the reflection surfaces M1, M2, and M3 are integrally rotatable about the first optical axis.

When the rotational displacement angle by which the reflection surface M3 is rotationally displaced about the axis Z of the incident light in FIG. 18B is 180°, the reflection surface M3 becomes orthogonal to the reflection surfaces M1 and M2 (ridge line of the roof surface), but the rotational displacement angle is not limited to 180°. For example, when the rotational displacement angle is 90°, the reflection surface M3 becomes in torsion relative to the reflection surfaces M1 and M2 (ridge line of the roof surface).

In other words, the reflection surface M3 serving as the third reflection surface may be parallel or orthogonal to the ridge line of the roof surface.

Second Modification

In the exemplary embodiments described above, the image projection apparatus (projector) in which the lens system is a projection optical system has been described as the optical apparatus, but the present invention can be applied to any desired optical apparatus that includes a lens system having a positive refractive power as a whole.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-090255, filed Apr. 27, 2015, which is hereby incorporated by reference herein in its entirety.

What is claimed is:

1. An optical system having a first optical axis on an incident side and a second optical axis on an exit side, the first optical axis being offset from the second optical axis, the optical system comprising:
    a reflection unit including
        a first reflection surface and a second reflection surface meeting at an angle, forming a reflecting roof surface, and
        a third reflection surface parallel or orthogonal to a ridge line of the roof surface, and positioned to reflect light along the second optical axis, the third reflection surface being different from the first reflection surface and the second reflection surface,
    wherein the reflection unit is rotatable about the first optical axis.

2. The optical system according to claim 1, wherein the first reflection surface and the second reflection surface meet orthogonally to each other.

3. The optical system according to claim 1, wherein the first optical axis and the second optical axis are parallel to each other, and the third reflection surface is parallel to the ridge line.

4. The optical system according to claim 1, wherein the reflection unit includes a roof prism having the roof surface, and
a triangular prism having the third reflection surface serving as a total-reflection surface.

5. The optical system according to claim 4, wherein the roof prism and the triangular prism are integrated.

6. The optical system according to claim 4, wherein the roof surface of the roof prism is provided with a coating for suppressing a phase jump.

7. The optical system according to claim 4, wherein the roof surface of the roof prism is provided with a metal reflective film.

8. The optical system according to claim 1, wherein the reflection unit includes a roof mirror having the roof surface, and
a reflection mirror having the third reflection surface.

9. The optical system according to claim 1, further comprising:

a lens system, wherein the optical system has a positive refractive power as a whole.

10. The optical system according to claim 9, wherein the lens system is a projection optical system configured to project an image on a screen and having a front side lens unit that is located on an enlargement conjugate side of the optical system relative to the reflection unit and a rear side lens unit that is located on a reduction conjugate side of the optical system relative to the reflection unit and having positive refractive power, the first optical axis is an optical axis of the rear side lens unit, and
the second optical axis is an optical axis of the front side lens unit.

11. The optical system according to claim 9, wherein the reflection unit includes a roof prism having the roof surface, and
a triangular prism having the third reflection surface serving as a total-reflection surface, and
the lens system includes at least one positive lens provided between the roof prism and the triangular prism.

12. The optical system according to claim 9, wherein the reflection unit includes a roof prism having the roof surface, and
a triangular prism having the third reflection surface serving as a total-reflection surface,
the lens system is a reimaging optical system having an intermediate imaging surface inside the optical system, and
the intermediate imaging surface is located inside one of the roof prism and the triangular prism or between the roof prism and the triangular prism.

13. The optical system according to claim 9, wherein the reflection unit includes a roof mirror having the roof surface, and
a reflection mirror having the third reflection surface, and
the lens system includes at least one positive lens provided between the roof mirror and the reflection mirror.

14. An optical apparatus, comprising:

a light source;
an image display element capable of modulation;
an illumination optical system configured to guide light emitted by the light source to the image display element;
an optical system having a first optical axis on an incident side and a second optical axis on an exit side, the first optical axis being offset from the second optical axis; and
a color separating and combining system configured to guide a light flux from the illumination optical system to the image display element and to guide light modulated by the image display element to the optical system, the optical system comprising:

a reflection unit including a first reflection surface and a second reflection surface meeting at an angle, forming a reflecting roof surface, and a third reflection surface parallel or orthogonal to a ridge line of the roof surface, and positioned to reflect light along the second optical axis, the third reflection surface being different from the first reflection surface and the second reflection surface, and wherein the reflection unit is rotatable about the first optical axis.

15. The optical apparatus according to claim 14, further comprising:

a shift mechanism configured to move the reflection unit and an optical member located toward the second optical axis relative to the reflection unit in a direction intersecting with the first optical axis, when the reflection unit and the optical member located toward the second optical axis relative to the reflection unit are rotated about the first optical axis.

16. The optical apparatus according to claim 15, further comprising:

a drive control unit configured to drive and control the shift mechanism so as to correct an influence of a change in a position of an image on a projection surface arising in association with a rotation of the reflection unit and the optical member located toward the second optical axis relative to the reflection unit about the first optical axis.

17. The optical system according to claim 1, wherein the reflection unit configured to reflect light from the incident side an odd number of times so as to guide the light to the exit side.

* * * * *